United States Patent [19]

Kondo et al.

[11] 4,036,534
[45] July 19, 1977

[54] ANTI-SKID CONTROL APPARATUS WITH BOOSTER DEVICE AND PRESSURE REDUCING DEVICE

[75] Inventors: Toshiyuki Kondo, Anjo; Takashi Nagashima, Toyota, both of Japan

[73] Assignee: Aisin Seiki Kabushiki Kaisha, Kariya, Japan

[21] Appl. No.: 703,149

[22] Filed: July 7, 1976

[30] Foreign Application Priority Data

July 7, 1975 Japan .................... 50-83340
July 7, 1975 Japan .................... 50-83341
July 7, 1975 Japan .................... 50-83342

[51] Int. Cl.$^2$ .................................. B60T 8/02
[52] U.S. Cl. .................. 303/6 R; 188/151 A;
303/114; 303/115; 303/119
[58] Field of Search ............... 303/6 C, 6 R, 10, 92,
303/2, 3, 114, 115, 116, 117, 119, 61–63, 68–69,
84 A; 188/181, 151 A; 60/548, 582; 91/391 R,
363 A

[56] References Cited

U.S. PATENT DOCUMENTS

| | | | |
|---|---|---|---|
| 3,666,328 | 5/1972 | Williams | 303/115 |
| 3,671,085 | 6/1972 | Pasek et al. | 303/115 |
| 3,813,130 | 5/1974 | Inada | 303/115 |
| 3,872,885 | 3/1975 | Eloi et al. | 303/6 C X |
| 3,881,780 | 5/1975 | Nyunoya | 303/115 |
| 3,910,640 | 10/1975 | Kozakai et al. | 303/6 C |

*Primary Examiner*—Trygve M. Blix
*Assistant Examiner*—Douglas C. Butler

*Attorney, Agent, or Firm*—Sughrue, Rothwell, Mion, Zinn and Macpeak

[57] ABSTRACT

In a hydraulic brake system of the type having a master cylinder, rear wheel brakes, an actuator disposed between the master cylinder and the rear wheel brakes for controlling the brake pressure increase to be applied to the rear wheel brakes in accordance with the skidding condition of a vehicle wheel, control apparatus for applying a brake pressure increase controlling signal to the actuator, a hydraulic brake booster for operating the master cylinder in accordance with the brake pedal depression, a pressure power source for supplying power pressure to the booster and having the actuating pressure for the hydraulic brake booster utilized as the actuating pressure for the actuator, the improvement comprises the inter-position of a regulating device between the booster and the actuator for increasing the output pressure at the same ratio as the input pressure while the actuating pressure is below a predetermined value and for increasing the output pressure at a smaller ratio than the input pressure when the input pressure gets above the predetermined value and a piston arrangement for opening an on-off valve of the actuator for controlling the communication between the master cylinder and the rear wheel brakes when the input pressure to the actuator, that is, the output pressure of the regulating device, is below a predetermined value to increase the output pressure of the actuator at the same ratio as the input pressure and for repeating the on-off movement of the on-off valve when the input pressure of the actuator is more than the predetermined value thereby increasing the output pressure of the actuator at a smaller ratio than the input pressure thereto.

4 Claims, 6 Drawing Figures

ANTI-SKID CONTROL APPARATUS WITH BOOSTER DEVICE AND PRESSURE REDUCING DEVICE

BACKGROUND OF THE INVENTION

1. Field of the Invention

The present invention relates to an anti-skid control apparatus and more particularly to an anti-skid control apparatus wherein an actuator utilizing a booster pressure applied by a hydraulic brake booster as the power pressure therefor may decrease the pressure applied to the rear wheel brake cylinders.

2. Prior Art

Conventionally, a proportioning valve is disposed between the master cylinder and the rear wheel brake cylinders to decrease proportionally the brake pressure.

SUMMARY OF THE INVENTION

The present invention provides an anti-skid control system wherein the cut-off valve of the actuator is on-off operated by decreasing the booster pressure being supplied to the actuator thereby controlling the proportional decrease of the pressure to be supplied to the rear wheel brakes.

The present invention provides a first embodiment of the anti-skid control apparatus wherein the piston of the actuator can be reciprocated to decrease the wheel brake pressure relative to the master cylinder pressure, that is to act as a proportioning valve, even before the initiation of an anti-skid operation.

The present invention provides a second embodiment of an anti-skid control apparatus wherein upon hydraulic failure of the front brakes, the power pressure supplied to the actuator is drained so as to permit the master cylinder to be fluidically connected to the wheel brake cylinders in a direct relationship, that is so as to cancel the proportioning valve effect.

The present invention provides a third embodiment of an anti-skid control apparatus wherein upon hydraulic failure of the front brakes the booster pressure is directly supplied to the actuator so as to cancel the proportioning valve effect and to make possible the anti-skid operation when the rear wheels are to be locked.

The foregoing and other objects, features and advantages of the invention will be apparent from the following more particular description of the preferred embodiments of the invention as illustrated in the accompanying drawings.

DETAILED DESCRIPTION OF THE PREFERRED EMBODIMENTS

Figure 1:
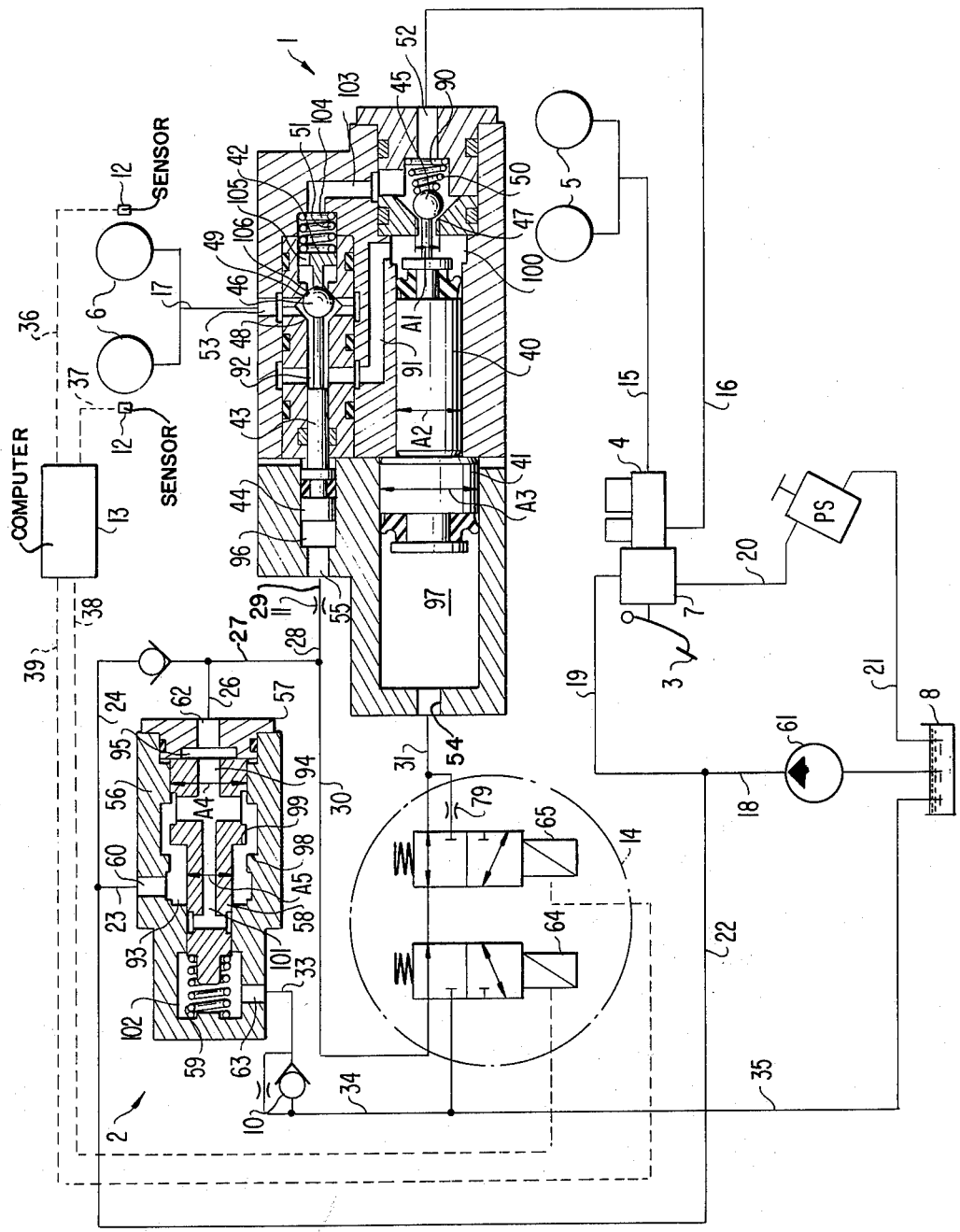
FIG. 1 is a schematic view of a first embodiment of the antiskid control apparatus according to the present invention.

The anti-skid brake control system according to the present invention as shown in the embodiment of FIG. 1 includes a brake pedal 3 which operates a conventional master cylinder 4 through a booster 7. A first conduit 15 connects the master cylinder 4 with the front wheel brakes 5 and a second conduit 16 connects the master cylinder 4 with the inlet port 52 of the actuator 1. The rear wheel brakes 6 are connected to the outlet port 53 of the actuator 1 by conduit 17.

A pump 61 is provided to supply control fluid under pressure from the reservoir 8 to the booster 7 to conduits 18 and 19 and thence to the power steering PS through the conduit 20. The conduit 21 connects the power steering back to the reservoir 8. The pump 61 also supplies fluid under pressure to the inlet 60 of the pressure decreasing device 2 through the conduits 22 and 23. The outlet 63 of the fluid decreasing device 2 is in fluid communication with the reservoir 8 by way of conduit 33, check valve 10 and conduits 34 and 35. The outlet 62 of the pressure decreasing device 2 is in fluid communication with the port 55 of the actuator 1 by way of conduits 26, 27, 28, restrictor 11 and conduit 29. The outlet port 62 of the fluid decreasing device 2 is also disposed in fluid communication with the port 54 of the actuator 1 by way of conduits 26, 27, 30, control valve 14 and conduit 31.

The actuator 1 is comprised of a main body having a pair of parallel stepped bores therein. The lower bore as viewed in FIG. 1 is provided with a pressure reducing piston 40 in the smaller diameter portion thereof which defines the pressure reducing chamber 100 at one end thereof. The opposite end of the pressure reducing piston 40 is disposed in engagement with a power piston 41 which is disposed in the larger diameter portion of the bore which defines a pressure chamber 97. The pressure reducing piston 40 is provided with a projection at the right-hand end thereof which is adapted to protrude through the aperture in the valve seat 47 for engagement with the ball 45 of a cut-off valve disposed in the chamber 90 which is in communication with inlet port 52. A spring 50 is provided in the chamber 90 for normally biasing the ball 45 into engagement with the valve seat 47 to shut-off communication between the chamber 90 and the pressure reducing chamber 100.

The upper bore of the actuator 1 as viewed in FIG. 1 is provided with a pair of valve members having valve seats 48 and 49 between which a ball valve 46 is movable by means of valve pistons 42 and 43. The valve piston 43 is disposed in operative engagement with a small power piston 44 which is operable in a bore defining a pressure chamber 96 in communication with the port 55. The valve piston 42 is provided with a through passage 105 and the valve piston 42 is normally biased to the left as viewed in FIG. 1 by the spring 51 located in the pressure chamber 104 which is in fluid communication with the pressure chamber 90 by way of passage 103. The chamber in which the ball valve 46 operates is connected to the conduit 17 leading to the rear wheel brakes 6 through the port 53. The ball valve 46 cooperates with the valve seat 49 to control communication between the chamber 106 and the outlet port 53 and cooperates with the valve seat 48 to control communication of the chamber 92 with the outlet port 53. Chamber 92 is disposed in fluid communication with the pressure reducing chamber 100 through the passage 91.

The pressure decreasing device 2 is comprised of a main body 56 having a central stepped bore therein closed at one end by the plug 57 in which the outlet port 62 is located. A spool valve piston 58 is slidably disposed within the bore in the body 56 and is normally biased into engagement with the plug 57 by the spring 59. The spool valve piston 58 and the bore in which it is slidable define a chamber 102 at one end thereof in communication with the outlet port 63 and a chamber 93 in communication with the inlet port 60. The spool valve piston 58 is provided with an internal passage 94 which communicates the inlet port 60 to the outlet port 62 when the piston 58 is shifted to the right as viewed in FIG. 1 and is also provided with an internal passage 101 which with the passage 94 provides communication between the ports 62 and 63 when the piston 58 is shifted to the left and the edges 98 and 99 interrupt communication with the inlet port 60.

Figure 2:
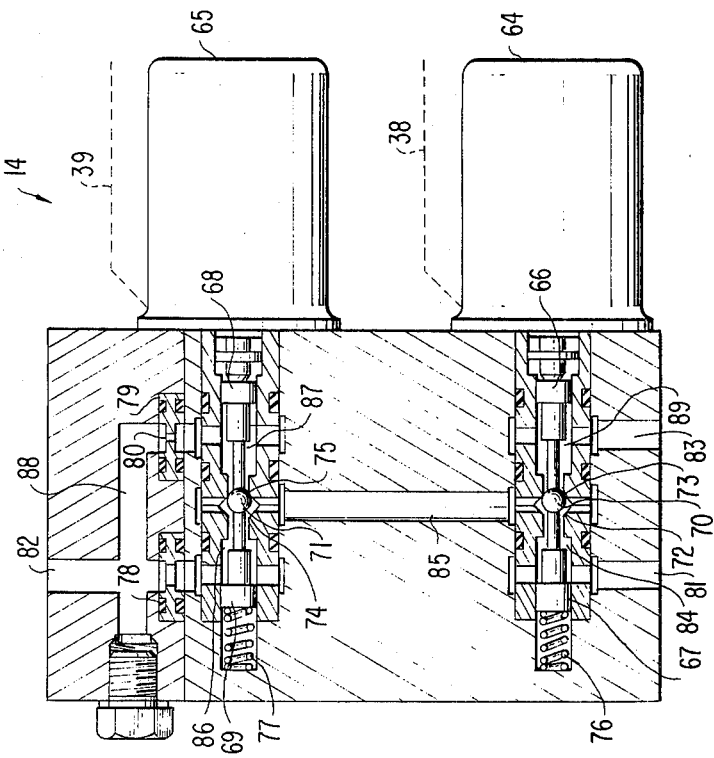
FIG. 2 is a detailed view, partly in section, of the solenoid operated valves shown in FIG. 1.

The detailed construction of the two solenoid operated valves within the circle 14 in FIG. 1 is shown in FIG. 2. The control valve 14 includes solenoids 64 and 65 which are connected to the computer 13 by electrical lines 38 and 39, respectively. The computer 13 receives input signals from the wheel sensors 12 associated with the rear wheels by way of electrical lines 36 and 37.

The armature of solenoid 64 is disposed in engagement with the piston 66 which is operable within the chamber 89 and a second piston 67 is disposed in chamber 84 in alignment with the valve 66 and is normally biased toward the solenoid 64 by means of the spring 76. A ball valve 70 is disposed between the pistons 66 and 67 for movement between valve seats 72 and 73. The ball 70 and valve seat 72 control communication between the passage 85 and the chamber 84 which in turn is in communication with the inlet port 81. The ball 70 and the valve seat 73 control communication between the passage 85 and the outlet port 83. The inlet port 81 is connected to the pressure decreasing device 2 by way of conduits 26, 27 and 30 and the outlet port 83 is connected to the reservoir 8 by way of conduits 32 and 35.

The armature of solenoid 65 engages the piston 68 operable within the chamber 87 and a piston 69 in chamber 86 is disposed in alignment with the piston 68 and is normally biased toward the solenoid 65 by the spring 77. A ball valve 71 is disposed between the two pistons 68 and 69 for movement. between valve seats 74 and 75. the ball valve 71 and the valve seat 74 control communication between the passage 85 and the outlet port 82 through chamber 86 and orifice 78. The ball valve 71 and the valve seat 75 control communication between the passage 85 and the outlet port 82 by way of chamber 87, the small restricting hole 80 in orifice 79 and passage 88. The outlet port 82 is connected to the port 54 of the actuator 1 by way of conduit 31.

When the solenoid 64 is off and the solenoid 65 is on the inlet 81 is connected to the output 82 through the chamber 84, passage 85, chamber 87, restricting hole 80 and passage 88. When the solenoid 64 is on and the solenoid 65 is off the outlet 82 is connected to the outlet 83 through chamber 86, passage 85 and chamber 89.

When both of the solenoids 64 and 65 are on the outlet 82 is connected to the outlet 83 through the passage 88, restricting hole 80, chamber 87, passage 85 and chamber 89.

In operation, when the brake pedal 3 is depressed upon a normal brake application, the pressure of the hydraulic brake booster 7 is increased so as to increase the master cylinder pressure and actuate the front wheel brakes 5. The rear wheel brakes 6 are actuated by the increased hydraulic pressure through the conduit 16, inlet 52, chambers 90, 100, passage 91, chamber 92, outlet 53, and the conduit 17. The increase of the pressure in hydraulic brake booster 7 also causes the pressure in the conduits 18, 22 to be increased. The thus increased pressure is supplied to the chamber 96 of actuator 1 from the conduit 23 via inlet 60 of the pressure decreasing device 2, chamber 93, passage 940, chamber 95, outlet 62, and the conduits 26, 27, 28 and 29. The pressure supplied to the chamber 96 is supplied also to the chamber 96 of actuator 1 through the conduit 30, control valve 14, and the conduit 31. The relationship between the booster pressure $P_B$ of the hydraulic brake booster 7 and the master cylinder pressure $P_M$ is now expressed as follows:

$$P_B = A \times P_M + b \qquad (1)$$

Figure 3:
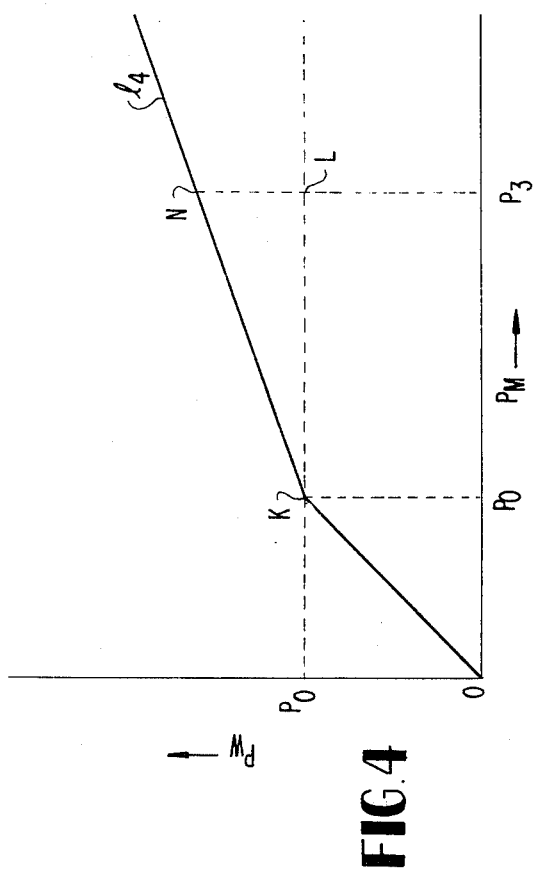
FIG. 3 is a diagram showing the relationship between the master cylinder pressure $P_M$ and the regulating pressure $P_R$ of the booster pressure after being decreased by a pressure decreasing device according to the present invention.

This line may be indicated by the line $l_1$ of FIG. 3 and the pressure is increased from Q to C on this line. When the booster pressure $P_B$ approaches the value $P_1$, i.e., the point C, the piston 58 is gradually moved left because $A_4 - A_5$, $A_4$ and $A_5$ being larger and smaller sectional areas of the piston 58 of the pressure decreasing device 2, respectively, and $S_2$ being the load of spring 59. Thus, an edge 98 of the body 56 is finally brought into contact with an edge 99 of the piston 58 to thereby interrupt the fluid communication between the chambers 93 and 95, i.e., the inlet 60 and the outlet 62. The booster pressure $P_1$ at this time is determined by the formula $P_1 \times A_5 = S_2$. When the booster $P_B$ is increased more than $P_1$ and the relationship between the pressure $P_B$ of the chamber 93 and the pressure $P_R$ of the chamber 95 is as follows:

$$P_R \times A_4 < P_B \times (A_4 - A_5) + S_2.$$

Then the piston 58 is moved right to disengage the edge 98 from the edge 99 and to allow the communication between the chambers 93 and 95. Therefore, the pressure $P_R$ of the chamber 95 is increased. When $P_R \times A_4$ is larger than $P_B \times (A_4 - A_5) + S_2$, the edges 98, 99 are again engaged with each other so as to interrupt the fluid communication between the chambers 93 and 95 and the pressure $P_R$ is not increased before the edge 98 is disengaged from the edge 99. As a consequence, the pressure $P_R$ is decreased from the pressure $P_B$ when $P_R \times A_4 = P_B \times (A_4 - A_5) + S_2$, and applied to the chambers 97, 96 of the actuator 1. The last mentioned formula may be rearranged by substituting the said formula (1) thereinto as follows:

$$P_R \times A_4 = (A \times P_M + b) \times (A_4 - A_5) + S_2$$

therefore $$\therefore P_R = A \times \left(1 - \frac{A_5}{A_4}\right) \times P_M + \left\{ b \times \left(1 - \frac{A_5}{A_4}\right) + \frac{S_2}{A_4} \right\} \qquad (2)$$

The relationship between $P_R$ and $P_M$ is thus obtained. This relationship may be expressed by the line $l_2$ of FIG. 3. Now in the formula (2), $$A \times \left(1 - \frac{A_5}{A_4}\right) \text{ and } \left(b \times \left(1 - \frac{A_5}{A_4}\right)\right)$$

may be substituted by $g$ and $h$, respectively, for simplicity to get the following formula:

$$P_R = g \times P_M + h \quad (3)$$

As stated above, when the booster pressure $P_B$ is increased more than $P_1$, the regulating pressure $P_R$ supplied to the chamber 97 of the actuator 1 is increased as indicated by the line $l_2$ of FIG. 3.

Now, the line $l_3$ of FIG. 3 may be expressed by the following formula:

$$P_R \times A_3 = (P_M \times A_2) + S_1 \quad (4)$$

$A_2$: sectional area of the pressure decreasing piston 40
$A_3$: sectional area of the power piston 41
$S_1$: load of the spring 50

In FIG. 3, E is an intersection of the lines $l_2$ and $l_3$, $P_0$ is the master cylinder pressure $P_M$ at E, and $P_2$ is the regulating pressure $P_R$ at E. When $P_R$ is smaller than $P_2$, $P_B$ is smaller than $P_1$, or $P_M$ is smaller than $P_0$, then the ball valve 45, the pressure decreasing piston 40 and the power piston 41 of the actuator 1 are kept at the position illustrated in FIG. 1 to thereby separate the ball valve 45 from the valve seat 47 because $P_R \times A_3 > (P_M \times A_2) + S_1$. However, upon $P_R > P_2$ or $P_M > P_0$, $P_R \times A_3$ is smaller than $(P_M \times A_2) + S_1$. Therefore, the pressure decreasing piston 40 and the power piston 41 are moved left to seat the ball valve 45 on the valve seat 47 by the spring 50. The fluidic communication between the chambers 90 and 100, i.e., the master cylinder 4 and the rear wheel brakes 6 is thus interrupted.

Figure 4:
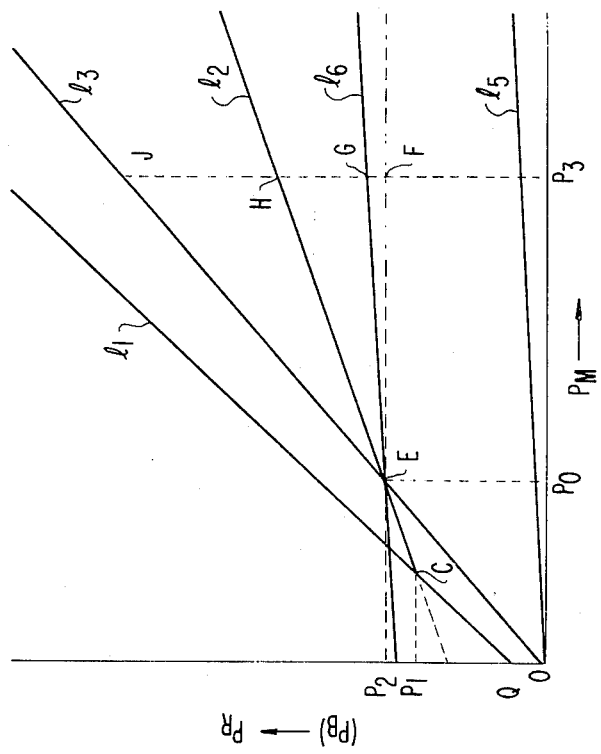
FIG. 4 is a diagram showing the relationship between the master cylinder pressure $P_M$ and the rear wheel cylinder pressure $P_W$.

When it is designed that the increase of $P_R \times A_3$ is much much more than the increase of $P_M \times A_1$ by setting $A_3 >> A_1$, the further pressure increase causes the power piston 41 and the pressure decreasing piston 40 to move right when $P_R \times A_3 + P_W \times A_1$ is larger than $P_W \times A_2 + P_M \times A_1 + S_1$ ($A_1$: effective sectional area of sealing by the ball valve 45 and the valve seat 47). Accordingly, the ball valve 45 is released from the valve seat 47 so as to increase the pressure $P_W$ of the chamber 100 by admitting the pressure of the chamber 90 to the chamber 100. When $P_R \times A_3 + P_W \times A_1$ is smaller than $P_W \times A_2 + P_M \times A_1 + S_1$, the piston 40 and the power piston 41 are moved left thereby interrupting the fluid communication between the chambers 90 and 100. The increase of the pressure $P_R$, $P_M$ causes the repetition of the above-mentioned operation so as to reduce the pressure $P_W$ relatively to the pressure $P_M$ as seen in FIG. 4. That is to say, the actuator 1 accomplishes features similar to a proportioning valve. The relationship of $P_R$, $P_M$, $P_W$ at this time may be expressed by $(P_R \times A_3 + P_W \times A_1 = P_W \times A_2 + P_M \times A_1 + S_1)$. This formula may be rearranged by substituting the formula (3) thereinto as follows:

$$(g \times P_M + h) \times A_3 + P_W \times A_1 = P_W \times A_2 + P_M \times A_1 + S_1$$

therefore $$P_W = \{(g \times A_3 - A_1)/(A_2 - A_1)\} \times P_M + (h \times A_3 - S_1)/(A_2 - A_1) \quad (5)$$

Such formula may be indicated by the line $l_4$ in FIG. 4. In FIG. 3, the line $l_5$ shows the relationship of $$P_R \times A_3 = P_M \times A_1. \quad (6)$$

The line $l_5$ is modified to line $l_6$ to intersect the point E. This $l_6$ shows the following formula:

$$P_R = \frac{A_1}{A_3} \times P_M + \left(P_2 - \frac{A_1}{A_3} \times P_0\right). \quad (7)$$

In consideration of FIGS. 3, 4, formulae (2)–(5) and (7) the slope of the line $l_4$, i.e., $L_N/K_L$ may be obtained as follows:

$$\frac{L_N}{K_L} = \frac{(g \times A_3) - A_1}{A_2 - A_1} = \frac{g - (A_1/A_3)}{A_2/A_3 - A_1/A_3} =$$

$$\frac{F_H/E_F - F_G/E_F}{F_J/E_F - F_G/E_F} = \frac{F_H - F_g}{F_J - F_G} = \frac{G_H}{G_J}$$

Consequently, when the size or dimension of each element is being set to obtain $K_L:L_N = G_J:G_H$, the above-mentioned characteristic features of the anti-skid control apparatus of this invention will be achieved.

The normal release of brakes is explained hereinbelow. When the depressed brake pedal 3 is being released, the booster pressure $P_B$ is decreased to reduce the pressure within the chamber 93. Thus, the piston 58 of the pressure decreasing device 2 is further moved left to permit the fluid communication between the passage 101 and the chamber 102, so that the fluid pressure of the chamber 95 is drained to the reservoir 8 via passages 94, 101, chamber 102, outlet 63, conduit 33, check valve 10, and the conduits 34, 35. As a result, the pressure $P_R$ in the chamber 95 is decreased. It is to be noted that the check valve 10 and the orifice 10' are provided for the pressure applied to the conduit 32 upon anti-skid operation and not to impart any effect onto the pressure decreasing device 2, as will be apparent hereinbelow. The pressure decrease of the chamber 95 causes the piston 58 to move right so as to isolate the passage 101 from the chamber 102. The pressure decrease of the chamber 93 reestablishes the fluid communication between the passage 101 and the chamber 102 to decrease again the pressure of the chamber 95. Such repetition allows the pressure $P_R$ as well as the pressure $P_M$ to be decreased as the pressure $P_B$ is decreased. Therefore, the pressure $P_R$, $P_M$ is decreased substantially in accordance with the line $l_2$ of FIG. 3. When the pressure $P_R$ or the pressure in the chamber 97 is decreased the pressure $P_M$ is also being decreased. However, since $P_M$ is larger than $P_W$, no pressure is admitted to the chamber 90 from the chamber 100 of actuator 1 and the pressure decreasing piston 40 and the power piston 41 are moved left with the balance of $P_R \times A_3 = P_W \times A_2$. Thus, the pressure $P_W$ is decreased in accordance with the decrease of the pressure $P_R$. When the pressure $P_R$ is below $P_2$ or the pressure $P_M$ is decreased below the point E, the pressure $P_M$ is smaller than the pressure $P_W$ and the hydraulic pressure in the chamber 100 causes the ball valve 45 to be opened. Thus, the pressure $P_W$ is decreased. Simultaneously, the pressure decreasing piston 40 and the power piston 41 begin to move right until the ball valve 45 is opened to thereby keep the fluid communication between the chambers 90 and 100. Then, when the pressure $P_B$ is below $P_1$, i.e., the pressure $P_B$ is decreased below the point C, the pressure $P_B$ is smaller than the pressure $P_R$. Thus, the check valve 9 is opened to admit the pressure of the chamber 95 to the conduit 24, thereby equalizing the pressure $P_B$ to the pressure $P_R$. Therefore, the piston 58 of the pressure decreasing device 2 is moved right by the spring 59. So, all the constituting elements of the apparatus are positioned at the original position illustrated in FIG. 1.

During the anti-skidding brake operation when the rear wheels are to be locked, the solenoid 64 is energized by the "on" signal of the computer 13. The piston 66 is thus moved left in FIG. 2 to isolate the ball 70 from the valve seat 73 and to seat the same on the valve seat 72, so that the inlet 81 is fluidically isolated from the passage 85 while the outlet 83 is fluidically connected to the passage 85. Consequently, the chamber 97 of actuator 1 is fluidically isolated from the pressure decreasing device 2 while the chamber 97 is fluidically connected to the reservoir 8. The hydraulic pressure in the chamber 97 is thus decreased. The pressure decreasing piston 40 and the power piston 41 are thus moved left by the pressure in the chamber 100 to thereby seat the ball 45 on the valve seat 47 due to action of the spring 50. Such increase in capacity of the chamber 100 results in decrease of the pressure in the chamber 100 to reduce the brake application on the rear wheel brakes 6. Subsequently, the solenoid 65 is energized due to action of the computer 13 to move the piston 68 to the left. The ball 71 is released from the valve seat 75 to be seated on the valve seat 74. Therefore, the passage 85 is interrupted from the chamber 86 while the passage 85 is connected to the passage 88, to thereby admit the fluid pressure of the chamber 97 through the restricted hole 80 of the orifice 79. The speed for pressure decrease in the chamber 97 is thus slowed. Upon release of the rear wheel lock both of the solenoids 64 and 65 are deenergized to return all the constituting elements of the control valve 14 to the illustrated position of FIG. 2. Accordingly, the chamber 97 is again pressurized to move the pistons 40, 41 to the right. The pressure in the chamber 100 is thus increased to apply the brakes on the rear wheels. Subsequently, the solenoid 65 is energized to slow the pressure increasing speed. The repetition of the above-mentioned movement attains the anti-skid operation.

In the event of the power pressure failure, for instance due to the failure of the pump 61, the elements of the pressure decreasing device 2 are located at the illustrated position of FIG. 1 to decrease the hydraulic pressure in the chambers 96, 97 of actuator 1. The ball 45 is thus seated on the valve seat 47 due to the spring 50 and the pressure difference between the pressure $P_M$ and $P_W$, and the ball 46 is seated on the valve seat 48 due to the spring 51 and the pressure difference between the pressure $P_M$ and $P_W$. As a result, the pressure of the master cylinder 4 is supplied to the rear wheel brakes 6 through the conduit 16, inlet 52 of actuator 1, chamber 90, passage 103, chamber 104, passage 150 on a piston 42, chamber 106, outlet 53 of the actuator 1, and the conduit 17.

As will be apparent from the foregoing description, according to the present invention the omission of the proportioning valve assembly to be disposed between the master cylinder and the wheel cylinders permits the air residing in the brake fluid to be easily expelled and the fluid quantity of the master cylinder used for brake application to be reduced, i.e., the brake pedal stroke to be reduced. In addition, the pressure decreasing device employs a spool valve, which means it is unnecessary to provide sealing cups and the like which have to be provided in the conventional proportioning valve assembly. Therefore, the elements or parts of the device may be diminished in number in comparison with a conventional system and any objectionable damage to the sealing cups or caused by the sealing cups may be avoided. Additionally, the response of the piston movement will be very quick upon the anti-skid brake operation since the pistons 40, 41 are being operated to close or slightly open the ball valve 45 relative to the valve seat 47.

It will be understood that the pressure decreasing valve 2 may be replaced by a load sensing valve which varies the wheel brake pressure reducing point in accordance with the vehicle load, or by a deceleration sensing valve which varies the wheel brake pressure reducing point in accordance with the vehicle deceleration.

Figure 5:
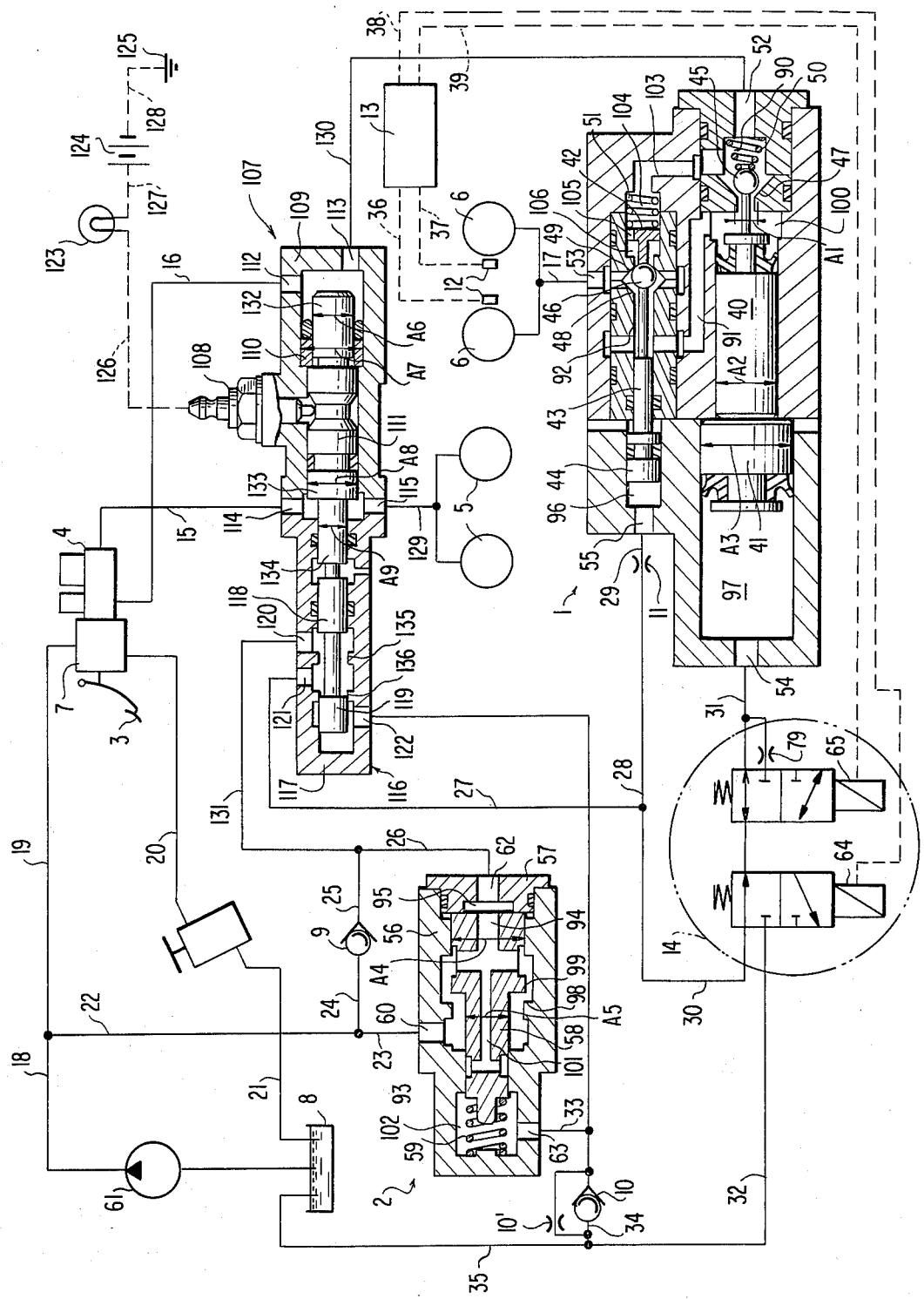
FIG. 5 is a schematic view of a second embodiment of the anti-skid control apparatus according to the present invention.

The structure of the second embodiment shown in FIG. 5 is substantially the same as that of the first embodiment except for the provision of a differential valve assembly 107. The differential valve assembly 107 is provided for detecting and warning of a hydraulic failure in the front or rear brake line. The assembly 107 itself is well known in the prior arts.

The differential valve assembly 107 comprises a switch 108, a body housing 109, a sleeve 110, a piston 111, an inlet port 112 fluidically connected to the master cylinder 4, an outlet port 113 fluidically connected to the rear wheel brake 6 through the actuator 1, an inlet port 114 fluidically connected to the master cylinder 4, and an outlet port 115 fluidically connected to the front wheel brakes 5. The valve assembly 107 further comprises a spool valve section 116 which includes a body 117, spool lands 118, 119 integral with the piston 111 to move in unison therewith, an inlet port 120 fluidically connected to the pressure decreasing device 2, an outlet port 121 fluidically connected to the actuator 1, and an outlet port 122 fluidically connected to the reservoir 8.

The switch 108 is electrically connected to a lamp 123 by lead 126, a battery 124 by lead 127, then by lead 128 to ground 125 which is connected to the body 109 of the valve assembly 107 through the vehicle body.

The differential valve assembly 107 is shown in the condition wherein no hydraulic failure has occurred, because the sectional areas of the piston 111 are as follows:

$$A_7 > A_8 - A_9 > A_6$$

$A_6$: sectional area of right land 132 of piston 111
$A_7$: $A_6$ plus sectional area of the sleeve 110
$A_8$: sectional area of intermediate land 133
$A_9$: sectional area of left land 134.

When the front brakes including the conduit 15 have hydraulically failed, $P_M \times (A_8 - A_9)$ is zero so that the piston 111 is moved left by $P_M \times A_6$ to engage the spool land 118 and the projection 135 of body 117 while releasing the spool land 119 from the projection 136 of body 117. Therefore, the inlet port 120 of spool section 116 is fluidically interrupted from the outlet port 121 while the outlet port 121 is connected to the outlet port 122. As a result, the fluidic communication between the pressure decreasing device 2 and the actuator 1 is interrupted while the fluidic communication between the actuator 1 and the reservoir 8 is established to drain the pressure in the chambers 96, 97 to the reservoir 8, as in the power pressure failure. Thus, the ball 46 is released from the valve seat 49 to be seated on the valve seat 48, and the ball 45 is seated on the valve seat 47. The master cylinder pressure $P_M$ is directly supplied to the rear wheel brakes 6 through the inlat 52 of the actuator 1, chamber 90, passage 103, chamber 104, passage 105 of piston 42, chamber 106, and the outlet 53.

The regulating pressure of the pressure decreasing device 2 is not admitted to the actuator 1 since the spool land 118 of the spool section 116 blocks the outlet port 121 from the inlet port 120. Therefore, the regulating pressure is applied only in the chamber 95 of the device 2, the conduits 26, 131 and 25. The booster pressure $P_B$ is, thus, not decreased and the hydraulic brake booster 7 is operated in the normal way.

The left movement of the piston 111 of valve assembly 107 activates, the switch 108 to light lamp 123. After recovery from the front brake failure the brake application returns the piston 111 to its original position since $P_M \times (A_8 - A_9)$ is larger than $P_M \times A_6$.

When the rear wheel brakes including the conduit 16 hydraulically fail, the piston 111 will be moved right to activate the switch 108. The spool land 119 is at this time, separated from the body projection 135. Thus, the regulating pressure of the device 2 is admitted to the actuator 1 while no pressure is supplied to the reservoir 8. Consequently, the brake booster 7 will be operated in the normal manner.

The spool section 116 may be disposed within the conduit 22 in place of the conduits 131 and 27 if it can diminish the pressure of the chambers 97, 96. In addition, the spool section 116 may be operated by activation of the switch 108 in place of mechanical movement of the piston 111, for instance, it may be constructed as an electric solenoid valve.

Figure 6:
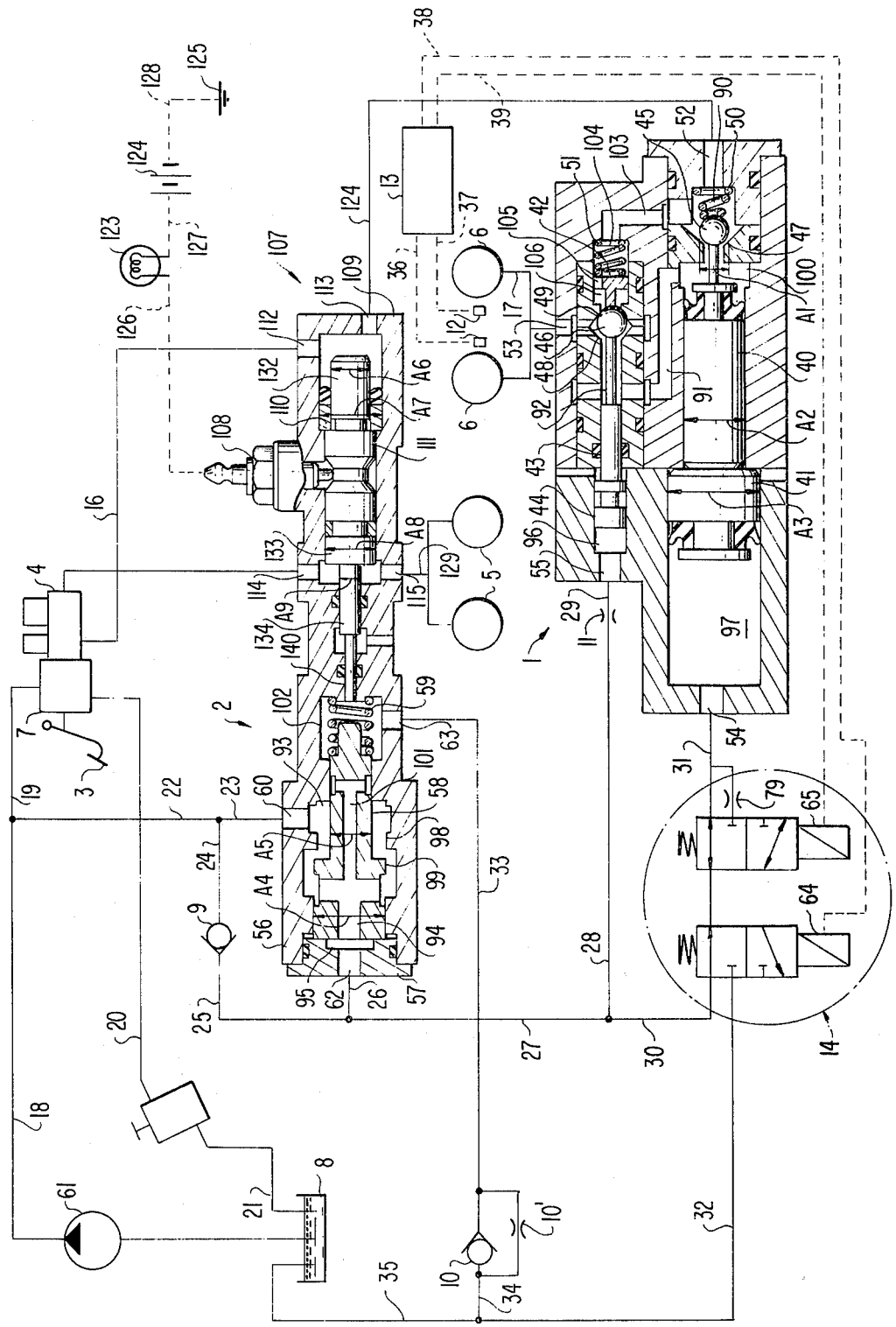
FIG. 6 is a schematic view of a third embodiment of the anti-skid control apparatus according to the present invention.

In the general structure of the third embodiment shown in FIG. 6, the spool section 116 of FIG. 5 is omitted and the pressure decreasing device 2 is connected to the differential valve assembly 107.

If the front wheel brakes including the conduit 15 have hydraulically failed, the piston 111 is moved to the left together with a rod 140 integral therewith. Thus, the piston 58 of the pressure decreasing device 2 is forced to move left. It is to be noted that $(P_M \times A_6 + S_2)$ is larger than $P_B \times A_5$. Thus, the edge 99 of the piston 58 is completely released from the edge 98 of the body 56 to thereby permit fluid communication between the chambers 93 and 95. The booster pressure $P_B$ is, therefore, applied directly to the actuator 1. The relationship between the booster pressure $P_B$ and the master cylinder pressure $P_M$ will be shown by the line $l1$ in FIG. 3, and the balancing relationship between the pressure $P_B$ and $P_M$ to the pistons 40, 41 will be shown by the line $l3$. Therefore, $(P_B \times A_3)$ is larger than $(P_M \times A_2 + S_1)$, to thereby keep the pistons 40, 41 in the illustrated position of FIG. 6. The master cylinder pressure $P_M$ is thus applied to the rear wheel brakes 6.

Under this situation, when the rear wheels are to be locked, the hydraulic pressure in the chamber 97 is decreased as in the anti-skid brake operation explained hereinabove. Accordingly, the power piston 41 and the piston 40 are moved to the left to seat the ball 45 on the valve seat 47 and to decrease the pressure in the chamber 100. The reciprocating movement of the pistons 40, 41 achieves the anti-skid brake operation as will be apparent from the previous description.

If the rear brakes including the line 16 have hydraulically failed, the piston 111 is moved right to activate the switch 108. At this time, no effect is imparted to the piston 58 of the pressure decreasing device 2 so that the brake booster 70 may be operated in the usual way.

What is claimed is:

1. In a hydraulic brake system of the type having a master cylinder, rear wheel brake cylinders operatively connected to said master cylinder, an actuator disposed between said master cylinder and said brake cylinders for controlling the brake pressure increase to be applied to the brake cylinder in accordance with a brake lock condition, control means for applying a brake pressure increase controlling signal to the actuator, hydraulic brake booster means for operating the master cylinder in accordance with brake pedal depression, and a fluid pressure power source means for supplying power pressure to said booster means wherein the actuating pressure of the hydraulic brake booster means is utilized as the actuating pressure for the actuator, the improvement comprising regulating means interposed between said booster means and said actuator, said regulating means including a valve for decreasing the output pressure of the regulating means when the pressure of said booster means being applied to said regulating means rises above a predetermined value, piston means in said actuator responsive to the output pressure of said regulating means and valve means in said actuator under the control of said piston means for controlling communication between said master cylinder and said brake cylinders, said piston means being adapted to open said valve means to permit communication between said master cylinder and said brake cylinders when the output pressure of said regulating means is below a predetermined value thereby increasing the output pressure of the actuator at the same ratio as the input pressure thereto and also being adapted to repeat on-off movement of said valve means when the output pressure of said regulating means is more than said predetermined value to increase the output pressure of the actuator at a smaller ratio than the input pressure thereto.

2. In a hydraulic brake system as set forth in claim 1 further comprising front brake cylinder means operatively connected to said master cylinder and a differential valve assembly interposed in the fluidic connections between said master cylinder and said front and rear brake cylinders, spool valve means operatively connected to said differential valve assembly and interposed in the fluidic connections between said booster means and said actuator, said differential valve assembly being responsive to a loss of pressure between said master cylinder and said front brake cylinders to operate said spool valve to interrupt communication between said regulating means and said actuator.

3. In a hydraulic brake system as set forth in claim 2 further comprising switch means operable in response to movement of said differential valve assembly and signal means operable by said switch means to indicate a failure of pressure to one of said front and rear brake cylinders.

4. In a hydraulic brake system as set forth in claim 1 further comprising front brake cylinders operably connected to said master cylinder and a differential valve assembly operatively disposed in the fluidic connection between said master cylinder and said front and rear brake cylinders, said regulating means being operably connected to said differential valve assembly so that upon failure of pressure to said front brake cylinders said differential valve assembly will operate said regulating means to directly apply pressure from said booster to said piston means in said actuator.

* * * * *